(No Model.)
P. LAUGHLIN.
FILTER.
No. 409,210. Patented Aug. 20, 1889.
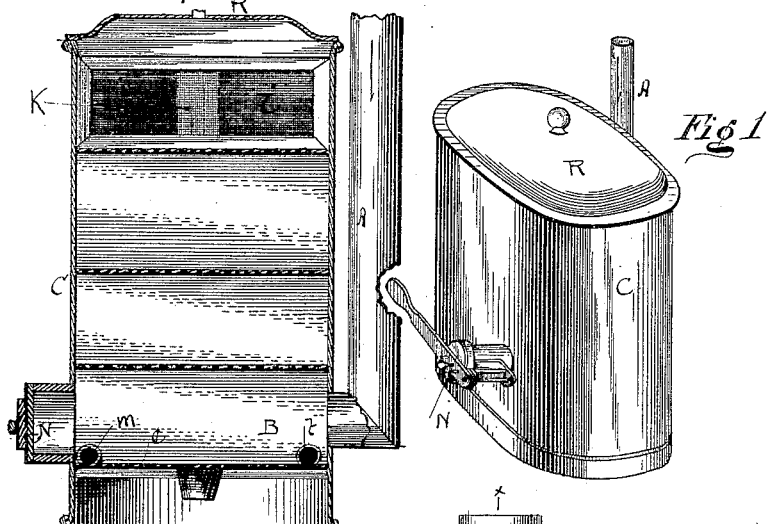
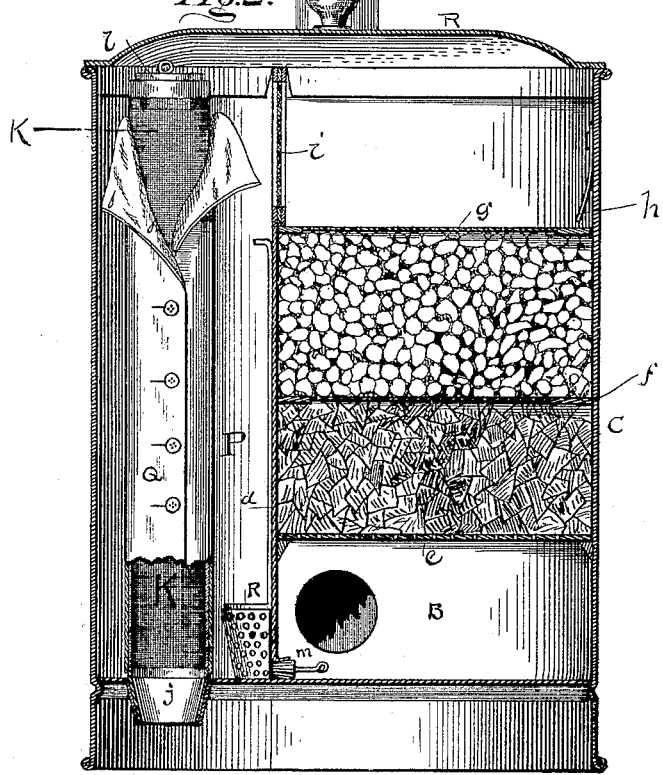
WITNESSES
J. B. McGirr.
Myles S. Smith.
INVENTOR
Patrick Laughlin
By his Atty
R. D. Smith

UNITED STATES PATENT OFFICE.

PATRICK LAUGHLIN, OF MOUNT STERLING, KENTUCKY.

FILTER.

SPECIFICATION forming part of Letters Patent No. 409,210, dated August 20, 1889.

Application filed May 9, 1887. Serial No. 237,651. (No model.)

*To all whom it may concern:*

Be it known that I, PATRICK LAUGHLIN, of Mount Sterling, in the county of Montgomery, in the State of Kentucky, have invented a new and useful Improvement in Filters; and I do hereby declare that the following is a full and accurate description of the same, reference being had to the accompanying drawings, wherein—

Figure 1 is a perspective view of my filter. Fig. 2 is a longitudinal section of the same. Fig. 3 is a transverse section of the same, taken on line $x\,x$, Fig. 2.

I am aware that filters have been constructed in a great variety of ways, intended to facilitate their operation or render it easy to cleanse or renew the filtering material, and also that it is not new to cause the fluid to pass upward through the filter-bed. Therefore I shall confine myself to the construction and mode of operation as hereinafter fully set forth.

A is the induction-pipe by which the fluid is received and conducted to the chamber B in the bottom of the filter-case C, which may be constructed of any suitable material and divided transversely and vertically by a partition $d$, on one side of which the filter-bed is placed, while on the other side is the receptacle for clear water. The roof of the chamber B is a perforated plate $e$, upon which I lay a quantity of broken charcoal, and above the charcoal I place another perforated plate or strainer $f$, which keeps the charcoal in place, but prevents it from becoming mixed with the gravel and sand above the strainer $f$, and which fills the filter to the level of the top of the partition $d$. The gravel and sand are kept in place by a strainer $g$, which is locked in place by some convenient device, such as the latch $h$. Above the partition $d$ there is a removable screen or strainer $i$, to catch and retain any particle of sand or other matter which may chance to be lifted by the water from the filter-bed.

When the fluid has passed through the strainer $i$, it falls into the clear-water chamber P. At the bottom of the clear-water chamber there is an opening $j$, provided with a tubular strainer K, made of wire-gauze or other suitable material. This tubular strainer extends nearly or quite to the top of the partition $d$, and its surface is covered with suitable cloth Q of some kind. The water in the clear-water chamber passes through this cloth and down the interior of said strainer and out through the opening $j$ to the cistern or other receptacle for the fully-filtered water.

In the lower part of the partition $d$ there is a small orifice $t$, stopped with a removable porous stopper-like sponge. The object of this opening and porous stopper R is to permit a small leak from the chamber B, through which the water remaining in said chamber and in the filter-bed after the inflow has ceased may be permitted to drain away gradually into the clear-water chamber and not be lost or wasted.

Continued use of the filter for a considerable length of time will cause it to become more or less fouled, so that a cleansing will be required. The principal fouling will be in the chamber B, that being the original receptacle wherein much of the sedimentary matter will be deposited in the first instance. When it is desired to cleanse the chambers, the tubular strainer K is removed and the opening $j$ is closed with a stopper $l$, which at other times may conveniently be used to close the upper end of the tubular strainer K. A plug $m$ closes an opening in the partition $d$, which connects chamber B with the clear-water chamber P, and after withdrawing said plug and stopping the discharge $j$ with the plug $l$ the clear-water chamber P may be washed out and the silt caused to pass into chamber B, whence it escapes through the gate N into the sewer or other proper place. The filter-bed may also be cleansed by pouring water through it from the top or strainer $g$, which in passing down through the filter-bed will return the silt to the chamber B. Water passing down the pipe A will rush through the chamber B and effectually cleanse it. Generally these cleansing operations may be effected during rain-storms, when the cistern is full; or if the filter is used to purify water derived from some constant source they may be conducted at any time.

The tubular strainer K and its cloth cover Q, being removable, may be cleansed easily at any time, and the cloth Q may be repaired and replaced at any time that such change is necessary.

The screen or strainer $i$ may be removed at any time for the purpose of being cleansed, and to make it easily removable its edges rest in grooves in the side of the case C.

The filter-bed itself may be removed easily when worn out or very foul, as the partition-strainers $f$ and $g$ are easily removable.

The whole may be covered by a close-fitting cover R.

This filter is particularly adapted for use with cisterns for holding rain-water for domestic use.

Having described my invention, I claim—

1. The combination, in a filter-case C, of the receiving-chamber B at the bottom of said case, the partition $d$, the strainer $e$ above the chamber B, and the filter-bed resting on said strainer, the screen $i$, and the clear-water chamber, with the removable tubular strainer K over the outlet $j$, as set forth.

2. The combination, in a filter-case C, of a partition $d$, a receiving-chamber B, and filter-bed on one side of said partition and a clear-water chamber on the other side, and the gate N and plug $m$, whereby silt may be washed from chamber B and discharged through gate N.

3. The combination, in a filter-case C, of the partition $d$, on one side whereof is the receiving chamber B and the filter-bed, and the clear-water chamber on the other side, and the filtering leak-plug $l$, whereby the water in chamber B and in the filter-bed may be permitted to pass into the clear-water chamber and be saved.

4. The combination, in a filter-case C, of a partition $d$, having the receiving-chamber and filter-bed on one side and the clear-water chamber on the other side, an outlet $j$, and a removable tubular strainer K, with a removable cloth cover, as set forth, whereby the final strainer may be removed and cleansed at any time.

PAT. LAUGHLIN.

Attest:
W. B. O'CONNELL,
FRANK LAUGHLIN.